(12) United States Patent
Harris et al.

(10) Patent No.: US 12,342,203 B2
(45) Date of Patent: Jun. 24, 2025

(54) OPTIMIZED UE ON- AND OFF-LOADING FOR ENERGY SAVING

(71) Applicant: Nokia Technologies Oy, Espoo (FI)

(72) Inventors: John Harris, Whitefish Bay, WI (US); Daniela Laselva, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 391 days.

(21) Appl. No.: 17/817,519

(22) Filed: Aug. 4, 2022

(65) Prior Publication Data
US 2024/0049024 A1    Feb. 8, 2024

(51) Int. Cl.
*H04W 24/10* (2009.01)
*H04W 24/08* (2009.01)
*H04W 52/18* (2009.01)

(52) U.S. Cl.
CPC ........... *H04W 24/10* (2013.01); *H04W 24/08* (2013.01); *H04W 52/18* (2013.01)

(58) Field of Classification Search
CPC ..... H04W 24/10; H04W 24/08; H04W 24/02; H04W 52/18; H04W 52/0203; H04B 17/382; H04B 17/24
See application file for complete search history.

(56) References Cited

U.S. PATENT DOCUMENTS

2019/0021025 A1 * 1/2019 Ahn .................... H04W 28/06

FOREIGN PATENT DOCUMENTS

EP           3001739 A1    3/2016
WO   WO-2017180194 A1 * 10/2017 ........ H04W 36/0094

OTHER PUBLICATIONS

3GPP TSG RAN Meeting #94e RP-213554 "New SI: Study on Network Energy Savings for NR" Electronic Meeting, Dec. 6-17, 2021.
3GPP TSG RAN Wgi Meeting #109-e R1-2205554 "Summary #3 for Email Discussion on Energy Saving Techniques of NW Energy Saving SI" e-Meeting, May 9-20, 2022.
ETSI TS 138 215 V16.2.0 "5G; NR; Physical Layer Measurements (3GPP TS 38.215 version 16.2.0 Release 16)" Jul. 2020.
ETSI TS 138 214 V16.2.0 "5G; NR; Physical Layer Procedures for Data (3GPP Ts 38.214 version 16.2.0 Release 16)" Jul. 2020.

(Continued)

*Primary Examiner* — Jamal Javaid
(74) *Attorney, Agent, or Firm* — Robert P. Michal, Esq.; Carter, DeLuca & Farrell LLP

(57) ABSTRACT

An apparatus may be configured to: determine an anticipated change in a transmit power of a cell, wherein the apparatus is connected to a network via the cell; perform one or more measurements related to the cell; modify the one or more measurements based, at least partially, on the anticipated change in the transmit power of the cell; and transmit a measurement report in response to the anticipated change in the transmit power of the cell, wherein the measurement report is based, at least partially, on the one or more modified measurements. An apparatus may be configured to: determine to change a transmit power to a user equipment for a first cell; transmit, to the user equipment, at least one message; initiate the change in the transmit power over a time period; and receive, from the user equipment, a measurement report in response to the at least one message.

3 Claims, 6 Drawing Sheets

(56) References Cited

OTHER PUBLICATIONS

ETSI TS 138 331 V16.1.0 5G; NR; Radio Resource Control (RRC); Protocol Specification (3GPP TS 38.331 version 16.1.0 Release 16) Jul. 2020.

Alberto Conte et al. "Cell Wilting and Blossoming for Energy Efficiency" Technologies for Green Radio Communication Networks, IEEE Wireless Communications. Oct. 2011.

"3rd Generation Partnership Project; Technical Specification Group Radio Access Network; NR; Medium Access Control (MAC) Protocol Specification (Release 17)" 3GPP TS 38.321, V17.1.0. Jul. 20, 2022. pp. 1-241.

\* cited by examiner

OPTIMIZED UE ON- AND OFF-LOADING FOR ENERGY SAVING

TECHNICAL FIELD

The example and non-limiting embodiments relate generally to network communication and, more particularly, to network energy savings.

BACKGROUND

It is known, in network communication, for a user equipment to transmit a radio resource management report in response to a trigger event.

SUMMARY

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: determine an anticipated change in a transmit power of a cell; perform one or more measurements related to the cell; modify the one or more measurements based, at least partially, on the anticipated change in the transmit power of the cell; and transmit a measurement report in response to the anticipated change in the transmit power of the cell, wherein the measurement report is based, at least partially, on the one or more modified measurements.

In accordance with one aspect, a method comprising: determining, with a user equipment, an anticipated change in a transmit power of a cell; performing one or more measurements related to the cell; modifying the one or more measurements based, at least partially, on the anticipated change in the transmit power of the cell; and transmitting a measurement report in response to the anticipated change in the transmit power of the cell, wherein the measurement report is based, at least partially, on the one or more modified measurements.

In accordance with one aspect, an apparatus comprising means for performing: determining an anticipated change in a transmit power of a cell; performing one or more measurements related to the cell; modifying the one or more measurements based, at least partially, on the anticipated change in the transmit power of the cell; and transmitting a measurement report in response to the anticipated change in the transmit power of the cell, wherein the measurement report is based, at least partially, on the one or more modified measurements.

In accordance with one aspect, a non-transitory computer-readable medium comprising instructions stored thereon which, when executed with at least one processor, cause the at least one processor to: determine an anticipated change in a transmit power of a cell; cause performing of one or more measurements related to the cell; modify the one or more measurements based, at least partially, on the anticipated change in the transmit power of the cell; and cause transmitting of a measurement report in response to the anticipated change in the transmit power of the cell, wherein the measurement report is based, at least partially, on the one or more modified measurements.

In accordance with one aspect, an apparatus comprising: at least one processor; and at least one memory storing instructions that, when executed by the at least one processor, cause the apparatus at least to: determine to change a transmit power to a user equipment for a first cell; transmit, to the user equipment, at least one message; initiate the change in the transmit power over a time period; and receive, from the user equipment, a measurement report in response to the at least one message.

In accordance with one aspect, a method comprising: determining to change a transmit power to a user equipment for a first cell; transmitting, to the user equipment, at least one message; initiating the change in the transmit power over a time period; and receiving, from the user equipment, a measurement report in response to the at least one message.

In accordance with one aspect, an apparatus comprising means for performing: determining to change a transmit power to a user equipment for a first cell; transmitting, to the user equipment, at least one message; initiating the change in the transmit power over a time period; and receiving, from the user equipment, a measurement report in response to the at least one message.

In accordance with one aspect, a non-transitory computer-readable medium comprising instructions stored thereon which, when executed with at least one processor, cause the at least one processor to: determine to change a transmit power to a user equipment for a first cell; cause transmitting, to the user equipment, of at least one message; initiate the change in the transmit power over a time period; and cause receiving, from the user equipment, of a measurement report in response to the at least one message.

According to some aspects, there is provided the subject matter of the independent claims. Some further aspects are defined in the dependent claims.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
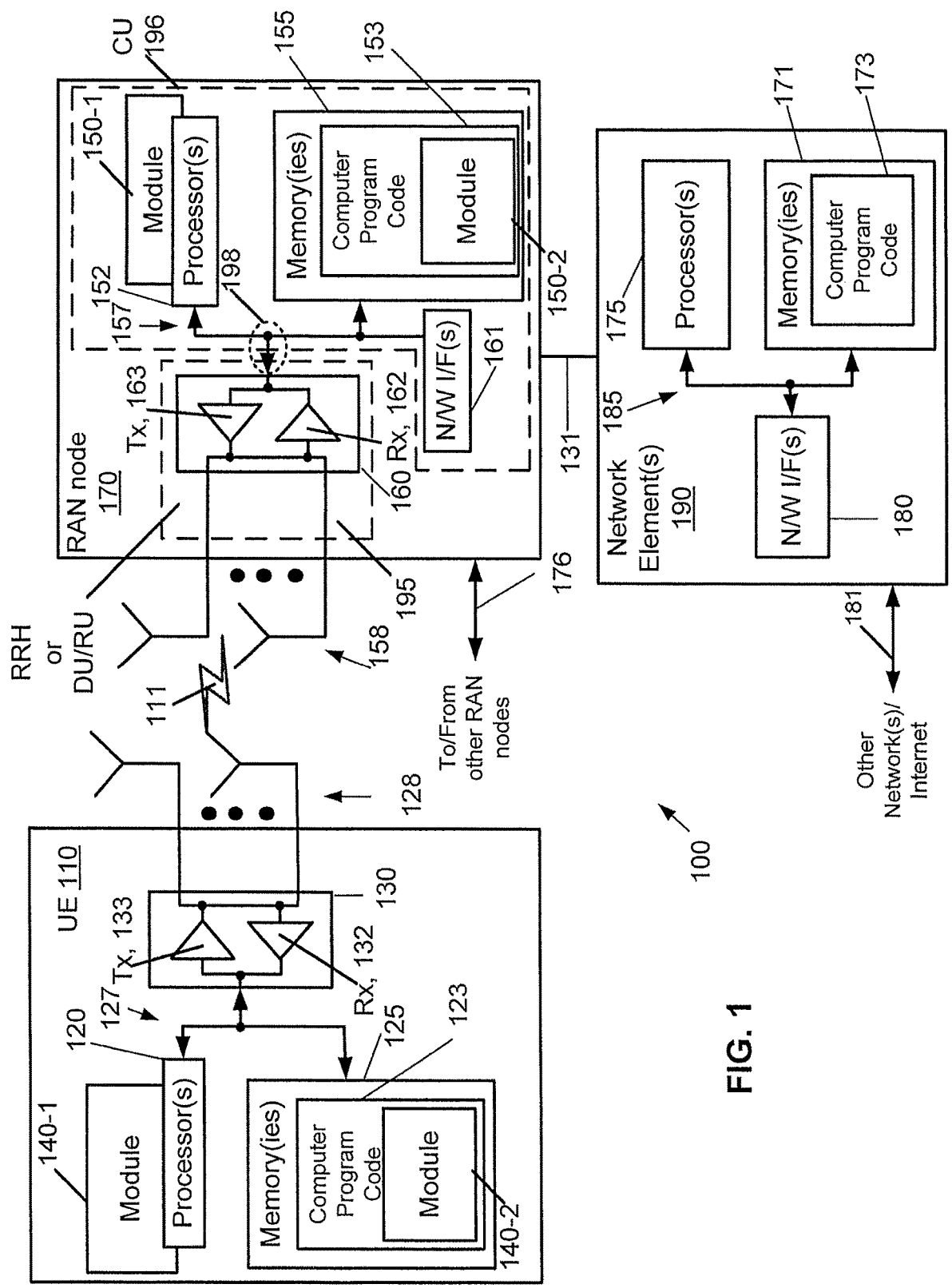
FIG. 1 is a block diagram of one possible and non-limiting example system in which the example embodiments may be practiced.

The following abbreviations that may be found in the specification and/or the drawing figures are defined as follows:

3GPP third generation partnership project
fifth generation
5G core network
ACK acknowledgement
AMF access and mobility management function
BFD beam failure detection
BS base station
BSR buffer status report
cRAN cloud radio access network
CSI-RS channel state information reference signal
CU central unit D2D device-to-device
DTx discontinuous transmission
DU distributed unit
EFC earth-fixed cell
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
EPRE energy per resource element
E-UTRA evolved universal terrestrial radio access, i.e., the LTE radio access technology
gNB (or gNodeB) (next generation) base station for 5G/NR, i.e., a node providing NR user plane and control plane protocol terminations towards the UE, and connected via the NG interface to the 5GC
HW hardware
I/F interface
IoT Internet of Things
L1 layer 1
LEO low-earth orbit
LTE long term evolution
MAC medium access control
MME mobility management entity
ng or NG new generation
ng-eNB or NG-eNB new generation eNB
NR new radio
NSA non-standalone
NTN non-terrestrial network
NAY or NW network
NZP-CSI-RS Non-zero-power channel state information reference signal
OFDM orthogonal frequency division multiplexing
O-RAN open radio access network
PBCH physical broadcast channel
PCI physical cell ID
PDCP packet data convergence protocol
PHY physical layer
PRACH physical random access channel
Prose proximity service
QoS quality of service
RACH random access channel
RAN radio access network
RF radio frequency
RLC radio link control
RLF radio link failure
RLM radio link monitoring
RRC radio resource control
RRH remote radio head
RRM radio resource management
RS reference signal
RSRP reference signal received power
RU radio unit
Rx receiver
SDAP service data adaptation protocol
SGW serving gateway
SI system information
SIP session initiation protocol
SL sidelink
SMF session management function
SS synchronization signal
SSB synchronization signal block
SSS secondary synchronization signal
Tx transmitter
UE user equipment (e.g., a wireless, typically mobile device)
UPF user plane function
WUR wake-up receiver
WUS wake-up signal
V2I vehicle to infrastructure
V2P vehicle to pedestrian
V2V vehicle to vehicle
V2X vehicle to everything
VNR virtualized network function Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. A "circuit" may include dedicated hardware or hardware in association with software executable thereon. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The UE 110 may be capable of sidelink communication with other UEs in addition to network communication or if wireless communication with a network is unavailable or not possible. For example, the UE 110 may perform sidelink communication with another UE which may include some or all of the features of UE 110, and/or may include additional features. Optionally, the UE 110 may also communicate with other UEs via short range communication technologies, such as Bluetooth®.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node. The RAN node 170 may also be or be located on a satellite or a non-terrestrial base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for may include access and mobility management function(s) (AMF(s)) and/or user plane function(s) (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions or functions of future technologies (e.g. 6G) might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers. For example, network core functions and/or radio access network(s) (e.g. CloudRAN, O-RAN, edge cloud) may be virtualized. Note that the virtualized entities that result from the network virtualization are still implemented, at some level, using hardware such as processors 152 or 175 and memories 155 and 171, and also such virtualized entities create technical effects.

It may also be noted that operations of example embodiments of the present disclosure may be carried out by a plurality of cooperating devices (e.g. cRAN).

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions. In addition, various embodiments of the user equipment 110 can include, but are not limited to, devices integrated into vehicles, infrastructure associated with vehicular travel, wearable devices used by pedestrians or other non-vehicular users of roads, user equipment unrelated to traffic users, and user equipment configured to participate in sidelink scenarios, such as public safety user equipment and/or other commercial user equipment.

Having thus introduced one suitable but non-limiting technical context for the practice of the example embodiments of the present disclosure, example embodiments will now be described with greater specificity.

Features as described herein generally relate to network communication. More specifically, features as described herein may generally relate to network energy savings.

A study on network energy savings will be carried out in 3GPP Rel.18, where the latest SID is given by RP-213554. The focus is on the radio access network (NW), which consumes the largest part of the total energy consumption in the network, and aims at identifying adaptation techniques of transmissions and/or receptions in time, frequency, spatial, and power domains, with potential support/feedback from UE, potential UE assistance information, and information exchange/coordination over network interfaces.

Currently, NW energy saving may be achieved using infrequent synchronization signal block (SSB) transmission. For example, an SSB periodicity of 160 ms may be considered in empty/low load situation in 5G non-standalone (NSA) deployments. NW energy saving may also be achieved using micro discontinuous transmission (DTx), which consists in shutting down the power amplifier on a per orthogonal frequency division multiplexing (OFDM) symbol basis, for example in symbols that do not carry data nor signaling. NW energy saving may also be achieved by shutting down further components (e.g., transmit antennas, baseband circuitry, etc.). NW energy saving may also be achieved by performing total cell switch OFF (i.e., cell shutdown), which allows to switch off most of the hardware components of a RAN site.

Some examples of potential techniques for energy savings are provided in R1-2205554.

Figure 2:
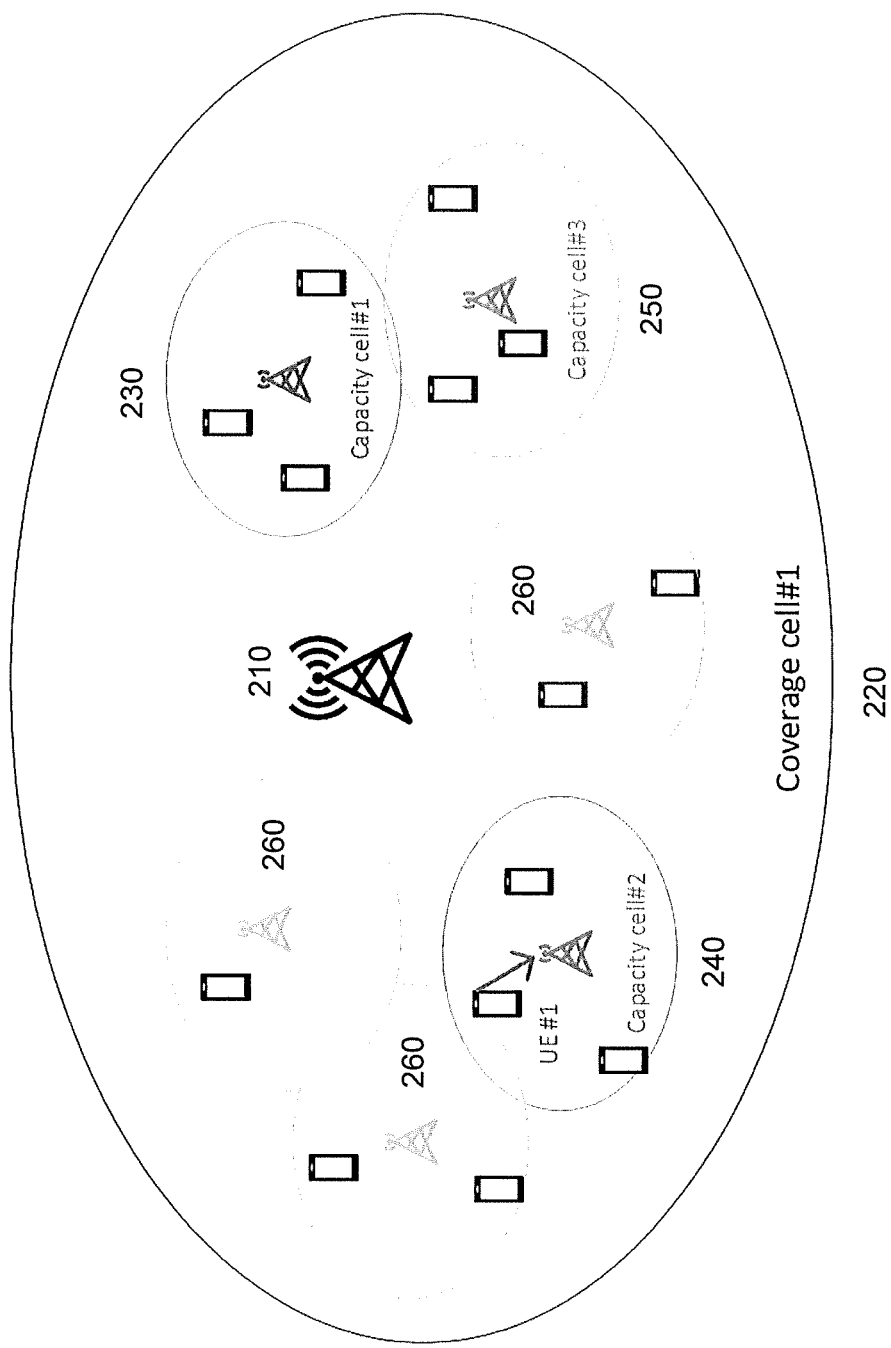
FIG. 2 is a diagram illustrating features as described herein.

An example of a typical NW deployment is depicted in FIG. 2. Within the coverage area (220) of a cell served by a Macro base station (BS) (210), which may be denoted as a coverage cell, there may be one or more smaller coverage areas served by small cells (e.g. 230, 240, 250), which may be denoted as capacity cells. The coverage cell (220) provides basic underlay coverage in the network in a certain area, and for that typically it operates at a low(er) frequency band, whereas the small cells (e.g. 230, 240, 250) are overlaid over the coverage cell (220) for capacity boosting within so-called hotspot areas, and typically operate at a higher frequency band than the coverage cell. As a result, all UEs in the area may be served by the coverage cell, whereas certain UEs located around the hotspots may be served by either the coverage area and/or a capacity cell (e.g. UE #1). The capacity cells may be active (e.g. capacity cell #1 (230), #2 (240), and #3 (250)) or switched off during low load/empty periods (e.g. capacity cell 260) to achieve network energy savings. Capacity cells may be turned ON/OFF depending on the traffic need, for example to offload the traffic from the coverage cell, if congested, or to boost the coverage cell capacity. Cell/BS switch off may in fact allow turning off of all active components of the cell/BS, and, as a result, significant energy consumption reduction may be achieved.

Example embodiments of the present disclosure may be applicable to a scenario similar to FIG. 2, but FIG. 2 is not limiting. Example embodiments of the present disclosure may also be applicable to non-terrestrial-network (NTN) scenarios. NTN may include low-earth orbit (LEO) satellite scenarios, where network devices located on satellites at altitudes of 300-1500 km provide coverage on earth with a better link budget and shorter latency as compared to geostationary satellites. The LEO satellites may be capable of beam-steering such that a beam (and thus an NR cell) may be projected towards a fixed location on earth for some time—known as (quasi) Earth-fixed cells (EFC). This may reduce the number of mobility events experienced by UEs, as compared to LEO satellites without beam-steering, where cells may be moving on earth in correspondence with satellite movement. However, even the EFC may eventually be subject to a change of satellite, for example because the previous satellite moves too far away from the fixed location on Earth. Depending on satellite constellation and capabilities, this happens more or less frequently, but the fast satellite movement (about 7.5 km/s for 600 km altitude) means that it is in the order of minutes for typical scenarios. When the satellite switch takes place, the network (operator) may either switch the beam of the current satellite away and then switch on the new beam, or first switch the new beam into the area and then switch the beam of the current satellite away. The latter approach may facilitate service continuity, where the UE may be able to perform a measurement of/to the new beam and a handover (or cell reselection for IDLE/INACTIVE UEs) to the new beam. Example embodiments of the present disclosure may be applicable where a cell is provided to a UE and handover may be performed for the UE, whether the cell is provided by a base station, satellite, a combination of virtualized elements, etc.

Example embodiments of the present disclosure may be applicable to sidelink UEs, for example in a scenario in which a network or cell switches off/on for a UE configured to perform sidelink (SL) operations. NR SL methods may be implemented to provide communication between a vehicle and a network, infrastructure(s), other vehicle(s), or other road user(s) in the surrounding/immediate area. Such communication may enable proximity service (ProSe), or transmission of information about the surrounding environment, between devices in close proximity, for example device-to-device (D2D) communication technology. Such direct communication may be available even when network coverage is unavailable. Additionally or alternatively, NR SL methods may relate to Internet of Things (IoT) and automotive industries (e.g., for reduction of accident risk and safer driving experiences). These use cases may include a message exchange among vehicles (V2V), vehicles and pedestrians (V2P), vehicles and infrastructure (V2I), and/or vehicles and networks (V2N), and may be referred to as vehicle-to-everything (V2X). The allocation of V2V resources in cellular, i.e., time and frequency resources, can be either controlled by the cellular network structure or performed autonomously by the individual vehicles (e.g. UE devices thereof). Sidelink may use same or different carrier frequencies or frequency bands than cellular communication.

An issue related to capacity cell deactivation/activation is the time and energy spent by the HW components to switch OFF/ON, which may be significantly long, for example in the order of minutes. To achieve the maximum network energy savings using cell deactivation, it may be helpful to be able to transition into/out of the cell sleep mode (e.g. an inactive state such as RRC_IDLE or RRC_INACTIVE) as quickly and efficiently as possible. Particularly, the interruption to services and performance degradation or failures (e.g. radio link failure (RLF), etc.) should be minimized when cell deactivation is used. Likewise, the amount of time that a cell is up and consuming energy but no longer providing connectivity services (in periods with no or low traffic demand) should also be minimized. At the same time, it should minimize the total amount of additional energy consumed during the cell ramp-up/ramp-down interval. This may be achieved by minimizing the amount of time required to perform the transition in/out of cell sleep mode and/or by reducing the amount of overhead/service cost(s) associated with entering/exiting cell sleep mode. In this way, it may be possible for the cell to spend more time in cell sleep mode, since it may use cell sleep mode even during shorter intervals.

In an example embodiment, smooth offload of the UEs from the current cell, that is, handover/switching off to a new cell, may be enabled by reducing the transmit power levels of the current serving cell so that the UE measurements will indicate that a target cell has one or more better radio conditions. The UE may measure the reference signal received power (RSRP) of cells based on e.g. the secondary synchronization signal (SSS), which may be contained in the SSB. Furthermore, the connected UEs may also base their RSRP measurements on Channel State Information Reference Signals (CSI-RS). No matter which reference signal is measured, in 5G the power level of either signal may be linked to the SS-PBCH-BlockPower parameter, which may be provided as part of SIB1 and defined as the "average energy per resource element (EPRE) of the resources elements that carry secondary synchronization signals in dBm that the NW used for SSB transmission."

This may mean that the change of the power level transmitted by a cell may be subject to providing a system information (SI) change indication to the UEs. Basically, the network may inform the UE in one modification period that the system information will change in the next modification period. According to TS 38.331, the modification period is [2 4 8 16]*default paging cycle (in radio frames), where the default paging cycle can be set out of [320, 640, 1280, 2560] ms. A typical paging cycle is 1280 ms, which means the cell power level cannot be changed more frequently than every 2*1.280 s~2.5 s (i.e. the absolute minimum would be 2*320 ms=640 ms). This SI information change may cause all the UEs in the cell, including UEs in RRC_IDLE, RRC_INACTIVE and RRC_CONNECTED modes/states, to read the updated SIB(s) for each step in which the power level of SS-PBCH-BlockPower is reduced/increased, and radio resource management (RRM) and/or other measurements may be performed during the transition period. A technical effect may be an increase in UE energy consumption, which is undesired.

A technical effect of example embodiments of the present disclosure may be to provide faster means to offload and onload a cell that is deactivating or reactivating (e.g. entering or leaving a sleep mode), saving both network and/or UE energy. Example embodiments of the present disclosure may also be used in NTN EFC scenarios, for example during the overlap of two satellites as the current satellite is moving away from the fixed location on Earth: the new satellite may switch the new beam into the overlapping area (gradually increasing the transmit power) and the current satellite may switch the beam away (gradually decreasing the transmit power).

Cell shutdown techniques may be initiated by progressively reducing the cell transmit power. By reducing the cell transmit power, the cell coverage shrinks while the area of neighboring cells may be likewise/correspondingly expanded so that the UEs served by the cell can move to a neighboring cell.

In an example embodiment, network-triggered measurement reporting from the UE, based on implicit or explicit signaling, may be implemented.

In an example embodiment, changes may be made to UE measurement operation(s).

In an example embodiment, new network signaling and/or UE behavior related to radio resource management (RRM) measurement(s) and/or L1 (beam) measurement(s), and corresponding reporting during transition period(s) when a cell performs Tx power decrease/increase, for example to enter/exit cell switch off, may be implemented. A technical effect of example embodiments of the present disclosure may be to allow a faster offload and/or onload of the capacity cell, as it enters or exits switch off mode, with resulting UE and network energy savings.

Figure 3:
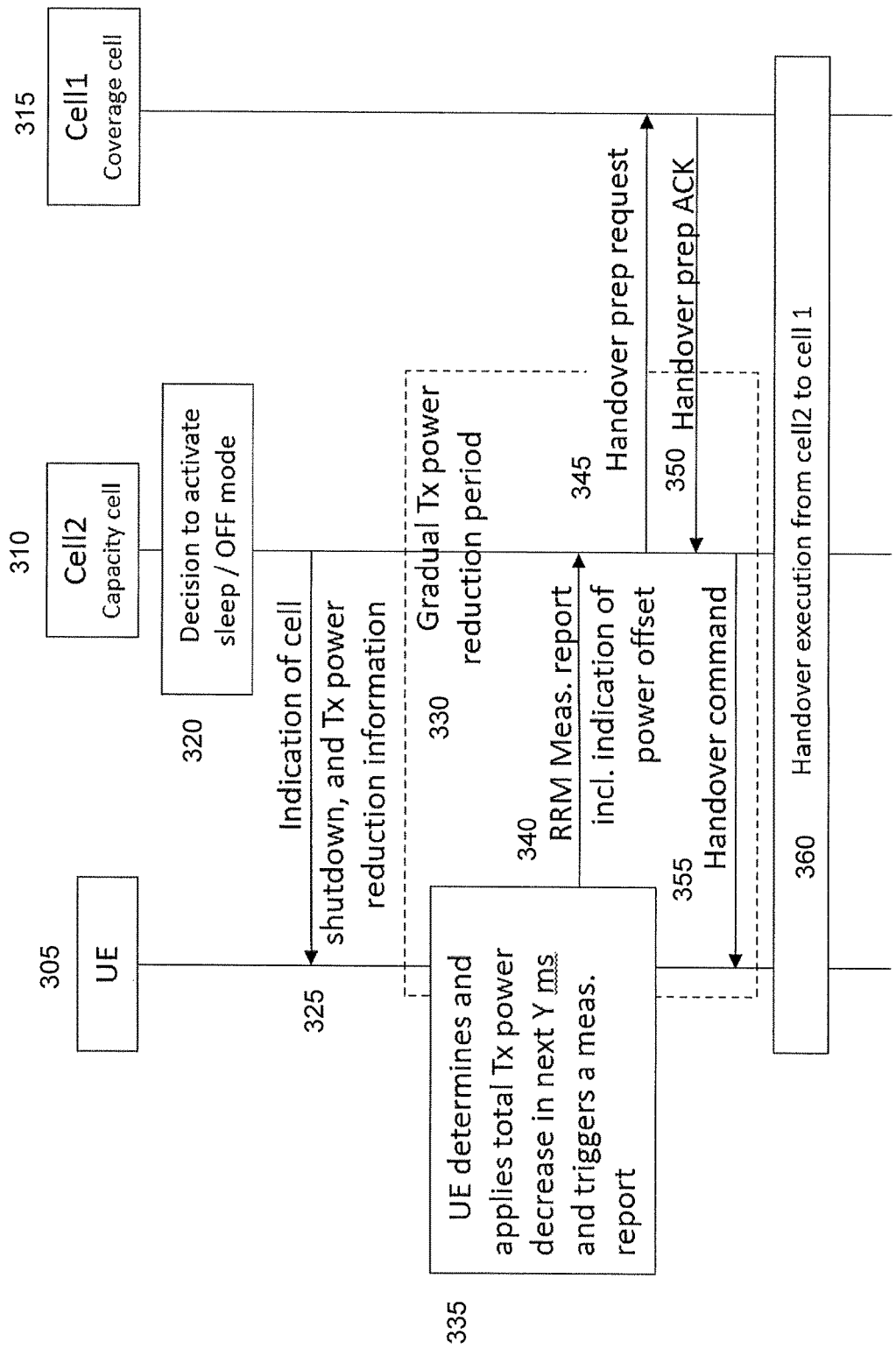
FIG. 3 is a diagram illustrating features as described herein.

Referring now to FIG. 3, illustrated is a signaling flow according to example embodiment(s) of the present disclosure. While FIG. 3 specifically illustrates a case of capacity cell sleep/turn OFF, example embodiments of the present disclosure may also apply to a case of cell (re)activation/turn ON, as further described below.

Just before the gNB/cell (310) enters or decides to enter cell sleep mode (or likewise after deciding cell reactivation) (320), it may send information to the UE (305) indicating a gradual reduction (or likewise increase) in transmit power to enter (or likewise exit) cell sleep mode (325). In an example embodiment, the information (e.g. indication of cell shutdown/reactivation, Tx power reduction/increase information, etc.) may include an indication that a cell sleep mode (or likewise that a cell reactivation) is triggered. In an example embodiment, the indication may trigger the UE (305) to send a measurement report (340) irrespective of whether any other event is triggered.

In an example embodiment, the power-down indication (or power-up indication) may be provided on a per beam basis. For example, one or more beams having lower load or no active UEs may be powered down more quickly than other beams. Alternatively, only some beams may be powered down, while at least one beam is kept powered. Alternatively, one or more beams may be powered up more quickly than other beams. For example, one or more beams having higher load or multiple active UES may be powered up more quickly than other beams. Alternatively, only some beams may be powered up, while at least one beam is kept the same or powered down.

In an example embodiment, the indication may trigger the UE (305) to exit RRM/RLM/BFD measurement relaxation, if that was (previously) applied (335).

Alternatively or additionally, the information (325) may include the total transmit power reduction (or increase) in the next time period (e.g. next Y msecs), which the UE may apply to its own current serving cell RSRP measurement (335) prior to that time for the purpose of generating the measurement report (340).

In an example embodiment, the indication of the cell sleep mode (or deactivation of sleep mode) (325) may trigger the UE (305) to send a (early or anticipated) buffer status report (BSR), which may also include the amount of anticipated uplink data expected during the next time period (e.g. next Y msecs). The amount of (anticipated) data may be used by the network to postpone (or otherwise adjust the timing of) the shutting down (or starting up) of the cell (310).

In an example embodiment, the information (325) may be provided in broadcast, a system information block(s) (SIB), and/or dedicated RRC signaling.

In an example embodiment, the information (325) about cell reactivation (or deactivation) may be provided by the coverage cell (315) (e.g. to speed up the UE (305) detection of a reactivated capacity cell (310)). For example, a cell that is changing its own transmit power may transmit information about its own (change in) transmit power. For example, if a cell is powering down, it may provide information about the decrease in the transmit power. For example, if a cell is powering up, the cell and/or a coverage cell may transmit information about the increase in transmit power.

The UE (305) in RRC_CONNECTED state may trigger a measurement report (340) upon receiving the information (325) related to the cell sleep mode (or likewise cell reactivation), and may apply (335) the transmit power reduction (or likewise increase) that is anticipated/expected/estimated to be applied by the network in the next period (next Y msecs), as negative (or likewise positive) bias to its serving cell, which is changing its power level, and/or to a neighbor cell. Additionally or alternatively, the UE may apply a bias to the measurement of a neighbor cell of the cell undergoing the transmit power change. The Tx power reduction (or likewise increase) may be applied immediately (for the purpose of generating measurement reports), for example before the corresponding power is actually (fully) reduced/ increased at the network side (330). This way, the NW (310) may know/determine immediately to which cell it should hand over the UE (e.g. 315), without waiting until the gradual powering off or reactivation (330) is completed and then measured and reported by the UE. The handover may be from a capacity cell to a coverage cell, from a coverage cell to a capacity cell, and/or between capacity cells. Furthermore, the UE (305) may minimize the number of RRM measurements made during the transition period(s) when the transmit power is varying (330), and may thereby have the technical effect of saving UE energy.

In an example embodiment, the UE may apply (e.g. to the configured measurements) the Tx power reduction (increase) anticipated over a part or the entire transition period, and may populate and send (340), preventively, the measurement report accordingly, irrespective of whether any measurement event, such as the "A3 event," is triggered.

In an example embodiment, the UE (305) may trigger the measurement report immediately (irrespective of whether any event is triggered) only if either it is deemed in low mobility or it is configured by the network. In other words, if the UE (305) is not in low mobility or is not configured by the network to send the measurement report immediately in response to the received information (325), the UE (305) may not transmit the measurement report until a trigger for sending the measurement report is detected.

In an example embodiment, the UE (305) may be required to perform some randomization around the timing of the measurement report transmission (340) so as to have the technical effect of distributing the timing of measurement reports from UEs. In other words, the UE (305) may wait a randomly calculated time period after receiving the information (325) to transmit the measurement report (340). In other words, the UE (305) may determine a time at which to transmit the measurement report based, at least partially, on a randomization factor. This may have the technical effect of avoiding the UEs present in the cell all attempting to transmit the measurement report at the same time.

In an example embodiment, the measurement report may be derived based upon the difference in signal strength between the serving cell and a neighbor cell (e.g. A3-like event), for example when both the serving cell and the neighbor cell are undergoing a power decrease, or both the serving cell and the neighbor cell are undergoing a power increase; then the UE (305) may apply different power offsets for the two or more cells simultaneously, possibly triggering an early measurement report to the serving cell.

In an example embodiment, the UE measurement report (340) may further explicitly or implicitly indicate that it is provided based upon some anticipated Tx power reduction/ increase offset(s). This may allow the base station of the cell (310) to distinguish the preemptive report for cell shutdown/ reactivation from other reports that may have been pending at the UE (305).

In an example embodiment, the UE (305) may utilize this information (325) related to cell switch off/reactivation to determine to preemptively provide a measurement report (340) at such a time so that it may coincide with the anticipated rate of decrease/increase in the serving/neighboring cell transmit power (as the serving cell enters/ neighbor cell exits cell sleep mode) and may coincide with the time when the transmit power reduction (or likewise increase) may be anticipated to be sufficient to normally trigger the measurement report. A technical effect of example embodiments of the present disclosure may be to ensure that measurement reports are received just in time, but not "too early."

In an example embodiment, the UE (305) may provide assistance information indicating that it may have a coverage problem if the indicated power reduction is applied (not illustrated in FIG. 3).

Figure 4:
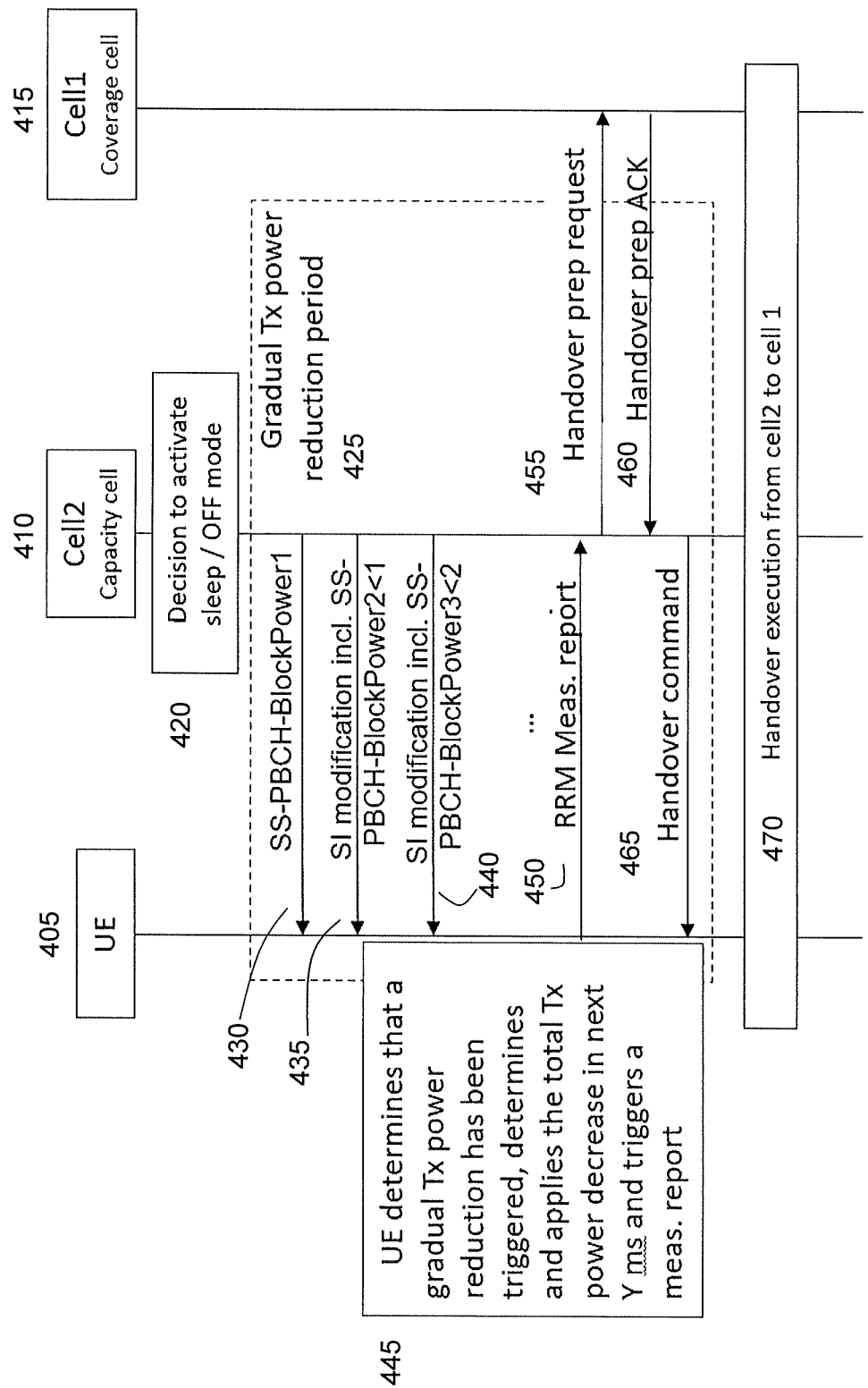
FIG. 4 is a diagram illustrating features as described herein.

Referring now to FIG. 4, illustrated is a signaling flow according to example embodiment(s) of the present disclosure. While FIG. 4 specifically illustrates a case of capacity cell sleep/turn OFF, example embodiments of the present disclosure may also apply to a case of cell activation, as further described below.

The UE (405), in an RRC_CONNECTED state, may determine that its serving cell (410) is applying/has determined to apply a (gradual) transmit power reduction (420), and may determine the rate of such reduction, and may apply the total transmit power reduction anticipated to be applied by the network in the next period (next Y msecs) to its measurements (445), before the transmit power is actually decreased at the network side (425), and may anticipate the triggering of the measurement report compared to normal report trigger (450) to be just in time to coincide with the time when the transmit power reduction is (fully) applied. The UE may also modify the L1 filtering of the measurement samples based on the anticipated power reduction/increase. For example, the UE may apply L1 filtering with a modified filtering period or apply the anticipated power reduction/increase to samples already measured, which are to be averaged together with at least a sample taken during the transition period. In another example, the UE may perform L1 filtering only of samples taken during the transition period, and which may be compensated based on the power reduction/increase. In another example, the power reduction/increase bias may also take into account the potential UE mobility estimated during the transition period.

Likewise, the UE (405) in the RRC_CONNECTED state may determine that a neighbor cell, a potential capacity boosting cell, is applying/has determined to apply a gradual transmit power increase (420), may determine the rate of such increase, and may apply the total transmit power increase anticipated to be applied by the network in the next period (next Y msecs) to its measurements (445), before the transmit power is actually increased at the network side (425). As a result, the UE (405) may anticipate the triggering of the measurement report compared to normal report trigger to be just in time to coincide with the time when the transmit power reduction is (fully) applied. It may be noted that, in FIG. 4, block 445 may occur between receipt of the SI modification (435) and the handover execution (470). Block 445 may be performed by the UE (405) concurrently with receipt of one or more further SI modification(s)) (440), transmission of RRM measurement report (450), cell2 (410) transmission of handover prep request (455), cell2 (410) receipt of handover prep ACK (460), handover execution from cell2 (410) to cell1 (415), and/or the gradual TX power reduction period (425). These steps and signaling may occur in the order illustrated in FIG. 4, may occur in a different order, may overlap in time, may occur alongside fewer or more elements, etc.; the flowchart illustrated by FIG. 4 is not limiting.

A person of ordinary skill in the art will understand that one, some, or all of these steps may occur in combination with the steps illustrated in FIG. 3, and that these steps may be performed concurrently with each other or with the steps illustrated in FIG. 3.

A technical effect of example embodiments of the present disclosure may be to allow to empty a cell faster, and save more energy at the network and UE side, as the UEs can omit measurements during the transition period when cell transmit power is increased or decreased.

Example embodiments of the present disclosure may be applied also to NTN networks in EFC mode; a technical effect of example embodiments of the present disclosure may be to offload UEs in RRC_CONNECTED mode quicker between the two overlapping cells in EFC. Reducing the needed overlap time to be as short as possible may have the technical effect of allowing to reduce the interference between the overlapping cells during the overlapping period (because frequency reuse 1 is likely to be used by the cells).

Figure 5:
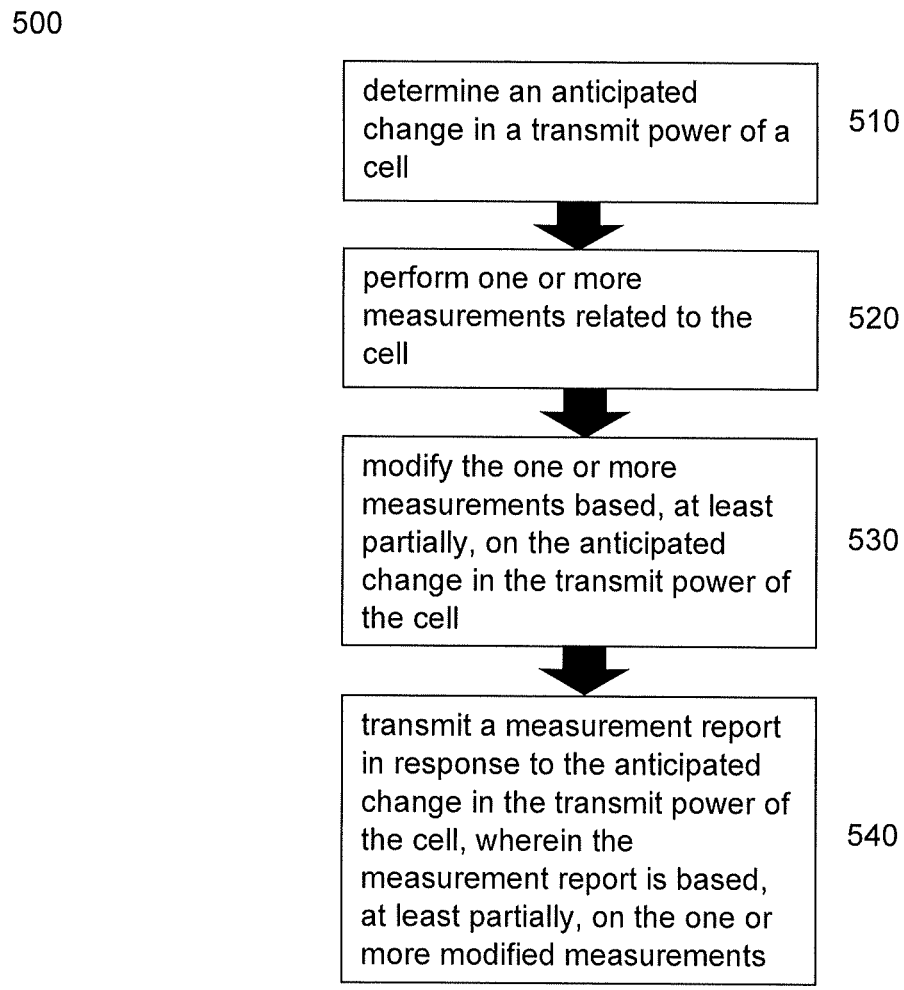
FIG. 5 is a flowchart illustrating steps as described herein.

FIG. 5 illustrates the potential steps of an example method 500. The example method 500 may include: determining an anticipated change in a transmit power of a cell, 510; performing one or more measurements related to the cell, 520; modifying the one or more measurements based, at least partially, on the anticipated change in the transmit power of the cell, 530; and transmitting a measurement report in response to the anticipated change in the transmit power of the cell, wherein the measurement report is based, at least partially, on the one or more modified measurements, 540. The example method 500 may, for example, be performed with a user equipment.

Figure 6:
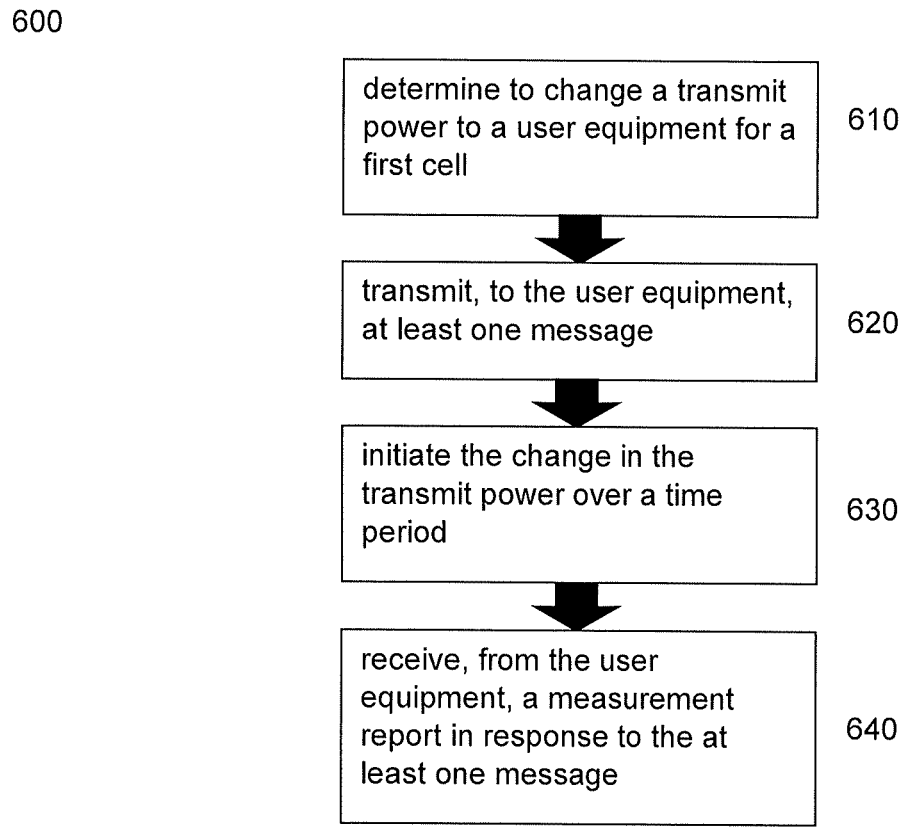
FIG. 6 is a flowchart illustrating steps as described herein.

FIG. 6 illustrates the potential steps of an example method 600. The example method 600 may include: determining to change a transmit power to a user equipment for a first cell, 610; transmitting, to the user equipment, at least one message, 620; initiating the change in the transmit power over a time period, 630; and receiving, from the user equipment, a measurement report in response to the at least one message, 640. The example method 600 may, for example, be performed with a base station, gNB, cell, or network entity.

In accordance with one example embodiment, an apparatus may comprise: at least one processor; and at least one memory storing instructions that, when executed by the at least one processor, cause the apparatus at least to: determine an anticipated change in a transmit power of a cell; perform one or more measurements related to the cell; modify the one or more measurements based, at least partially, on the anticipated change in the transmit power of the cell; and transmit a measurement report in response to the anticipated change in the transmit power of the cell, wherein the measurement report may be based, at least partially, on the one or more modified measurements.

The example apparatus may be served by the cell.

Determining the anticipated change in the transmit power of the cell may comprise the example apparatus being further configured to: receive, from a network, an indication of at least one of: an anticipated amount of reduction in the transmit power of the cell over a first time period, an anticipated amount of increase in the transmit power of the cell over a second time period, a sleep mode of the cell is triggered, a cell reactivation of the cell is triggered, a trigger to send the measurement report, one or more beams of the cell are powering down, the one or more beams of the cell are powering up, the apparatus is moving out of a range of coverage of the cell, or the apparatus is moving into the range of coverage of the cell.

The example apparatus may be further configured to: exit, in response to the received indication, at least one of: radio resource management measurement relaxation, radio link monitoring measurement relaxation, or beam failure detection measurement relaxation.

The example apparatus may be further configured to: transmit a buffer status report, wherein the buffer status report may be related to uplink data that is associated with one of the first time period or the second time period.

The indication may be received via at least one of: broadcast, a system information block, dedicated radio resource control signaling, or signaling received from a coverage cell of the network.

Determining the anticipated change in the transmit power of the cell may comprise the example apparatus being further configured to: determine that the cell is changing the transmit power; determine a rate of change of the transmit power; and determine the anticipated change in the transmit power of the cell based, at least partially, on the determined rate of change and an anticipated time period for the change of the transmit power, wherein the anticipated time period may comprise at least one of the first time period or the second time period.

The measurement report may be transmitted at a time determined based, at least partially, on the anticipated time period for the change of the transmit power.

The example apparatus may be further configured to: generate the measurement report based, at least partially, on the one or more modified measurements.

The measurement report may comprise an indication of the anticipated change in the transmit power of the cell.

The one or more measurements may comprise at least one of: one or more radio resource management measurements, or one or more L1 beam measurements.

Transmitting the measurement report may comprise the example apparatus being further configured to: determine a time for transmitting the measurement report based, at least partially, on at least one of: a randomization factor, or a time period associated with the anticipated change in transmit power of the cell.

In accordance with one aspect, an example method may be provided comprising: determining, with a user equipment, an anticipated change in a transmit power of a cell; performing one or more measurements related to the cell; modifying the one or more measurements based, at least partially, on the anticipated change in the transmit power of the cell; and transmitting a measurement report in response to the anticipated change in the transmit power of the cell, wherein the measurement report is based, at least partially, on the one or more modified measurements.

The user equipment may be served by the cell.

Determining the anticipated change in the transmit power of the cell may comprise receiving, from a network, an indication of at least one of: an anticipated amount of reduction in the transmit power of the cell over a first time period, an anticipated amount of increase in the transmit power of the cell over a second time period, a sleep mode of the cell is triggered, a cell reactivation of the cell is triggered, a trigger to send the measurement report, one or more beams of the cell are powering down, the one or more beams of the cell are powering up, the apparatus is moving out of a range of coverage of the cell, or the apparatus is moving into the range of coverage of the cell.

The example method may further comprise: exiting, in response to the received indication, at least one of: radio resource management measurement relaxation, radio link monitoring measurement relaxation, or beam failure detection measurement relaxation.

The example method may further comprise: transmitting a buffer status report, wherein the buffer status report may be related to uplink data that is associated with one of the first time period or the second time period.

The indication may be received via at least one of: broadcast, a system information block, dedicated radio resource control signaling, or signaling received from a coverage cell of the network.

Determining the anticipated change in the transmit power of the cell may comprise: determining that the cell is changing the transmit power; determining a rate of change of the transmit power; and determining the anticipated change in the transmit power of the cell based, at least partially, on the determined rate of change and an anticipated time period for the change of the transmit power, wherein the anticipated time period may comprise at least one of the first time period or the second time period.

The measurement report may be transmitted at a time determined based, at least partially, on the anticipated time period for the change of the transmit power.

The example method may further comprise: generating the measurement report based, at least partially, on the one or more modified measurements.

The measurement report may comprise an indication of the anticipated change in the transmit power of the cell.

The one or more measurements may comprise at least one of: one or more radio resource management measurements, or one or more L1 beam measurements.

Transmitting the measurement report may comprise: determining a time for transmitting the measurement report based, at least partially, on at least one of: a randomization factor, or a time period associated with the anticipated change in transmit power of the cell.

In accordance with one example embodiment, an apparatus may comprise: circuitry configured to perform: determining, with a user equipment, an anticipated change in a transmit power of a cell; circuitry configured to perform: performing one or more measurements related to the cell; circuitry configured to perform: modifying the one or more measurements based, at least partially, on the anticipated change in the transmit power of the cell; and circuitry configured to perform: transmitting a measurement report in response to the anticipated change in the transmit power of the cell, wherein the measurement report is based, at least partially, on the one or more modified measurements.

In accordance with one example embodiment, an apparatus may comprise: processing circuitry; memory circuitry including computer program code, the memory circuitry and the computer program code configured to, with the processing circuitry, enable the apparatus to: determine an anticipated change in a transmit power of a cell; perform one or more measurements related to the cell; modify the one or more measurements based, at least partially, on the anticipated change in the transmit power of the cell; and transmit a measurement report in response to the anticipated change in the transmit power of the cell, wherein the measurement report may be based, at least partially, on the one or more modified measurements.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: determining an anticipated change in a transmit power of a cell; performing one or more measurements related to the cell; modifying the one or more measurements based, at least partially, on the anticipated change in the transmit power of the cell; and transmitting a measurement report in response to the anticipated change in the transmit power of the cell, wherein the measurement report may be based, at least partially, on the one or more modified measurements.

The example apparatus may be served by the cell.

The means configured to perform determining the anticipated change in the transmit power of the cell may comprise means configured to perform: receiving, from a network, an indication of at least one of: an anticipated amount of reduction in the transmit power of the cell over a first time period, an anticipated amount of increase in the transmit power of the cell over a second time period, a sleep mode of the cell is triggered, a cell reactivation of the cell is triggered, a trigger to send the measurement report, one or more beams of the cell are powering down, the one or more beams of the cell are powering up, the apparatus is moving out of a range of coverage of the cell, or the apparatus is moving into the range of coverage of the cell.

The means may be further configured to perform: exiting, in response to the received indication, at least one of: radio resource management measurement relaxation, radio link monitoring measurement relaxation, or beam failure detection measurement relaxation.

The means may be further configured to perform: transmitting a buffer status report, wherein the buffer status report may be related to uplink data that is associated with one of the first time period or the second time period.

The indication may be received via at least one of: broadcast, a system information block, dedicated radio resource control signaling, or signaling received from a coverage cell of a network.

The means configured to perform determining the anticipated change in the transmit power of the cell may comprise means configured to perform: determining that the cell is changing the transmit power; determining a rate of change of the transmit power; and determining the anticipated change in the transmit power of the cell based, at least partially, on the determined rate of change and an anticipated time period for the change of the transmit power, wherein the anticipated time period may comprise at least one of the first time period or the second time period.

The measurement report may be transmitted at a time determined based, at least partially, on the anticipated time period for the change of the transmit power.

The means may be further configured to perform: generating the measurement report based, at least partially, on the one or more modified measurements.

The measurement report may comprise an indication of the anticipated change in the transmit power of the cell.

The one or more measurements may comprise at least one of: one or more radio resource management measurements, or one or more L1 beam measurements.

The means configured to perform transmitting the measurement report may comprise means configured to perform: determining a time for transmitting the measurement report based, at least partially, on at least one of: a randomization factor, or a time period associated with the anticipated change in transmit power of the cell.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: determine an anticipated change in a transmit power of a cell; cause performing of one or more measurements related to the cell; modify the one or more measurements based, at least partially, on the anticipated change in the transmit power of the cell; and cause transmitting of a measurement report in response to the anticipated change in the transmit power of the cell, wherein the measurement report may be based, at least partially, on the one or more modified measurements.

In accordance with another example embodiment, a non-transitory program storage device readable by a machine may be provided, tangibly embodying instructions executable by the machine for performing operations, the operations comprising: determine an anticipated change in a transmit power of a cell; cause performing of one or more measurements related to the cell; modify the one or more measurements based, at least partially, on the anticipated change in the transmit power of the cell; and cause transmitting of a measurement report in response to the anticipated change in the transmit power of the cell, wherein the measurement report may be based, at least partially, on the one or more modified measurements.

In accordance with another example embodiment, a non-transitory computer-readable medium comprising instructions that, when executed by an apparatus, cause the apparatus to perform at least the following: determine an anticipated change in a transmit power of a cell; cause performing of one or more measurements related to the cell; modify the one or more measurements based, at least partially, on the anticipated change in the transmit power of the cell; and cause transmitting of a measurement report in response to the anticipated change in the transmit power of the cell, wherein the measurement report may be based, at least partially, on the one or more modified measurements.

A computer implemented system comprising: at least one processor and at least one non-transitory memory storing instructions that, when executed by the at least one processor, cause the system at least to perform: determine an anticipated change in a transmit power of a cell; cause performing of one or more measurements related to the cell; modify the one or more measurements based, at least partially, on the anticipated change in the transmit power of the cell; and cause transmitting of a measurement report in response to the anticipated change in the transmit power of the cell, wherein the measurement report may be based, at least partially, on the one or more modified measurements.

A signal with embedded data, the signal being encoded in accordance with an encoding process which comprises: determine an anticipated change in a transmit power of a cell; cause performing of one or more measurements related to the cell; modify the one or more measurements based, at least partially, on the anticipated change in the transmit power of the cell; and cause transmitting of a measurement report in response to the anticipated change in the transmit power of the cell, wherein the measurement report may be based, at least partially, on the one or more modified measurements.

A computer implemented system comprising: means for determining an anticipated change in a transmit power of a cell; means for performing one or more measurements related to the cell; means for modifying the one or more measurements based, at least partially, on the anticipated change in the transmit power of the cell; and means for transmitting a measurement report in response to the anticipated change in the transmit power of the cell, wherein the measurement report is based, at least partially, on the one or more modified measurements.

In accordance with one example embodiment, an apparatus may comprise: at least one processor; and at least one memory storing instructions that, when executed by the at least one processor, cause the apparatus at least to: determine to change a transmit power to a user equipment for a first cell; transmit, to the user equipment, at least one message; initiate the change in the transmit power over a time period; and receive, from the user equipment, a measurement report in response to the at least one message.

The example apparatus may be further configured to: complete the change in the transmit power after receiving the measurement report.

The at least one message may comprise an indication of the transmit power and one or more indications of modifications to the transmit power.

The at least one message may comprise an indication of at least one of: an amount of reduction in the transmit power of the first cell over the time period, an amount of increase in the transmit power of the first cell over the time period, a sleep mode of the first cell is triggered, a trigger to send the measurement report, one or more beams of the first cell are powering down, or the user equipment is moving out of range of the first cell.

The example apparatus may be further configured to: cause handover of the user equipment to a second cell.

The at least one message may comprise an indication of at least one of: a cell reactivation of the second cell is triggered, one or more beams of the second cell are powering up, or the user equipment is moving out of range of the second cell.

In accordance with one aspect, an example method may be provided comprising: determining to change a transmit power to a user equipment for a first cell; transmitting, to the user equipment, at least one message; initiating the change in the transmit power over a time period; and receiving, from the user equipment, a measurement report in response to the at least one message.

The example method may further comprise: completing the change in the transmit power after receiving the measurement report.

The at least one message may comprise an indication of the transmit power and one or more indications of modifications to the transmit power.

The at least one message may comprise an indication of at least one of: an amount of reduction in the transmit power of the first cell over the time period, an amount of increase in the transmit power of the first cell over the time period, a sleep mode of the first cell is triggered, a trigger to send the measurement report, one or more beams of the first cell are powering down, or the user equipment is moving out of range of the first cell.

The example method may further comprise: causing handover of the user equipment to a second cell.

The at least one message may comprise an indication of at least one of: a cell reactivation of the second cell is triggered, one or more beams of the second cell are powering up, or the user equipment is moving out of range of the second cell.

In accordance with one example embodiment, an apparatus may comprise: circuitry configured to perform: determining to change a transmit power to a user equipment for a first cell; circuitry configured to perform: transmitting, to the user equipment, at least one message; circuitry configured to perform: initiating the change in the transmit power over a time period; and circuitry configured to perform: receiving, from the user equipment, a measurement report in response to the at least one message.

In accordance with one example embodiment, an apparatus may comprise: processing circuitry; memory circuitry including computer program code, the memory circuitry and the computer program code configured to, with the processing circuitry, enable the apparatus to: determine to change a transmit power to a user equipment for a first cell; transmit, to the user equipment, at least one message; initiate the change in the transmit power over a time period; and receive, from the user equipment, a measurement report in response to the at least one message.

In accordance with one example embodiment, an apparatus may comprise means for performing: determining to change a transmit power to a user equipment for a first cell; transmitting, to the user equipment, at least one message; initiating the change in the transmit power over a time period; and receiving, from the user equipment, a measurement report in response to the at least one message.

The means may be further configured to perform: completing the change in the transmit power after receiving the measurement report.

The at least one message may comprise an indication of the transmit power and one or more indications of modifications to the transmit power.

The at least one message may comprise an indication of at least one of: an amount of reduction in the transmit power of the first cell over the time period, an amount of increase in the transmit power of the first cell over the time period, a sleep mode of the first cell is triggered, a trigger to send the measurement report, one or more beams of the first cell are powering down, or the user equipment is moving out of range of the first cell.

The means may be further configured to perform: causing handover of the user equipment to a second cell.

The at least one message may comprise an indication of at least one of: a cell reactivation of the second cell is triggered, one or more beams of the second cell are powering up, or the user equipment is moving out of range of the second cell.

In accordance with one example embodiment, a non-transitory computer-readable medium comprising instructions stored thereon which, when executed with at least one processor, cause the at least one processor to: determine to change a transmit power to a user equipment for a first cell; cause transmitting, to the user equipment, of at least one message; initiate the change in the transmit power over a time period; and cause receiving, from the user equipment, of a measurement report in response to the at least one message.

In accordance with another example embodiment, a non-transitory program storage device readable by a machine may be provided, tangibly embodying instructions executable by the machine for performing operations, the operations comprising: determine to change a transmit power to a user equipment for a first cell; cause transmitting, to the user equipment, of at least one message; initiate the change in the transmit power over a time period; and cause receiving, from the user equipment, of a measurement report in response to the at least one message.

In accordance with another example embodiment, a non-transitory computer-readable medium comprising instructions that, when executed by an apparatus, cause the apparatus to perform at least the following: determine to change a transmit power to a user equipment for a first cell; cause transmitting, to the user equipment, of at least one message; initiate the change in the transmit power over a time period; and cause receiving, from the user equipment, of a measurement report in response to the at least one message.

A computer implemented system comprising: at least one processor and at least one non-transitory memory storing instructions that, when executed by the at least one processor, cause the system at least to perform: determine to change a transmit power to a user equipment for a first cell; cause transmitting, to the user equipment, of at least one message; initiate the change in the transmit power over a time period; and cause receiving, from the user equipment, of a measurement report in response to the at least one message.

A signal with embedded data, the signal being encoded in accordance with an encoding process which comprises: determine to change a transmit power to a user equipment for a first cell; cause transmitting, to the user equipment, of at least one message; initiate the change in the transmit power over a time period; and cause receiving, from the user equipment, of a measurement report in response to the at least one message.

A computer implemented system comprising: means for determining to change a transmit power to a user equipment for a first cell; means for transmitting, to the user equipment, at least one message; means for initiating the change in the transmit power over a time period; and means for receiving, from the user equipment, a measurement report in response to the at least one message.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
   at least one processor; and
   at least one non-transitory memory storing instructions that, when executed by the at least one processor, cause the apparatus at least to:
   determine an anticipated change in a transmit power of a cell;
   perform one or more measurements related to the cell;
   modify the one or more measurements based, at least partially, on the anticipated change in the transmit power of the cell; and
   transmit a measurement report in response to the anticipated change in the transmit power of the cell, wherein the measurement report is based, at least partially, on the one or more modified measurements;
   wherein determining the anticipated change in the transmit power of the cell comprises the at least one memory, storing the instructions, when executed by the at least one processor, causes the apparatus to:
   receive, from a network, an indication of at least one of:
      an anticipated amount of reduction in the transmit power of the cell over a first time period,
      an anticipated amount of increase in the transmit power of the cell over a second time period,
      a sleep mode of the cell is triggered,
      a cell reactivation of the cell is triggered,
      a trigger to send the measurement report,
      one or more beams of the cell are powering down,
      the one or more beams of the cell are powering up,
      the apparatus is moving out of a range of coverage of the cell, or
      the apparatus is moving into the range of coverage of the cell; and
   wherein the at least one memory, storing the instructions, when executed by the at least one processor, further causes the apparatus to:
      exit, in response to the received indication, at least one of:
         radio resource management measurement relaxation,
         radio link monitoring measurement relaxation, or
         beam failure detection measurement relaxation.

2. An apparatus comprising:
   at least one processor; and
   at least one non-transitory memory storing instructions that, when executed by the at least one processor, cause the apparatus at least to:
   determine an anticipated change in a transmit power of a cell;
   perform one or more measurements related to the cell;
   modify the one or more measurements based, at least partially, on the anticipated change in the transmit power of the cell; and
   transmit a measurement report in response to the anticipated change in the transmit power of the cell, wherein the measurement report is based, at least partially, on the one or more modified measurements;
   wherein determining the anticipated change in the transmit power of the cell comprises the at least one memory, storing the instructions, when executed by the at least one processor, causes the apparatus to:
   receive, from a network, an indication of at least one of:
      an anticipated amount of reduction in the transmit power of the cell over a first time period,
      an anticipated amount of increase in the transmit power of the cell over a second time period,
      a sleep mode of the cell is triggered,
      a cell reactivation of the cell is triggered,
      a trigger to send the measurement report,
      one or more beams of the cell are powering down,
      the one or more beams of the cell are powering up,
      the apparatus is moving out of a range of coverage of the cell, or
      the apparatus is moving into the range of coverage of the cell; and
   wherein determining the anticipated change in the transmit power of the cell comprises the at least one memory, storing the instructions, when executed by the at least one processor, causes the apparatus to:
      determine that the cell is changing the transmit power;
      determine a rate of change of the transmit power; and
      determine the anticipated change in the transmit power of the cell based, at least partially, on the determined rate of change and an anticipated time period for the change of the transmit power, wherein the anticipated time period comprises at least one of the first time period or the second time period.

3. The apparatus of claim 2, wherein the measurement report is transmitted at a time determined based, at least partially, on the anticipated time period for the change of the transmit power.

* * * * *